(12) United States Patent
Romero et al.

(10) Patent No.: US 7,523,454 B2
(45) Date of Patent: Apr. 21, 2009

(54) APPARATUS AND METHOD FOR ROUTING A TRANSACTION TO A PARTITIONED SERVER

(75) Inventors: Francisco J. Romero, Plano, TX (US); Raja Daoud, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1857 days.

(21) Appl. No.: 09/799,662

(22) Filed: Mar. 6, 2001

(65) Prior Publication Data

US 2002/0129127 A1 Sep. 12, 2002

(51) Int. Cl.
*G06F 9/46* (2006.01)
*G06F 15/00* (2006.01)

(52) U.S. Cl. .................. 718/105; 718/101; 718/103; 718/104; 712/13

(58) Field of Classification Search ......... 718/100–108; 709/200–253; 712/13
See application file for complete search history.

(56) References Cited

U.S. PATENT DOCUMENTS

| | | | | |
|---|---|---|---|---|
| 5,155,851 A * | 10/1992 | Krishnan | ................. | 718/105 |
| 5,574,914 A * | 11/1996 | Hancock et al. | ............. | 712/220 |
| 5,687,372 A * | 11/1997 | Hotea et al. | ................. | 718/105 |
| 6,249,800 B1 * | 6/2001 | Aman et al. | ................. | 718/105 |
| 6,311,216 B1 * | 10/2001 | Smith et al. | ................. | 709/226 |
| 6,336,134 B1 * | 1/2002 | Varma | ................. | 709/205 |
| 6,542,926 B2 * | 4/2003 | Zalewski et al. | ............. | 709/213 |
| 6,687,735 B1 * | 2/2004 | Logston et al. | ............. | 709/203 |
| 6,778,540 B1 * | 8/2004 | Ratcliff et al. | ............. | 370/401 |
| 6,854,021 B1 * | 2/2005 | Schmidt et al. | ................. | 710/5 |
| 7,051,188 B1 * | 5/2006 | Kubala et al. | ................. | 712/29 |

OTHER PUBLICATIONS

U.S. Appl. No. 09/493,753, filed Jan. 28, 2000, for "Dynamic Management of Computer Workloads Through Service Level Optimization" by Clifford A. McCarthy and Raja Daoud.
Hewlett-Packard Company, "HP Process Resource Manager C.01.08.2", Dec. 2000, 16 pp.
IBM, "Information About Logical Partitions", Dec. 21, 2000. 1 p.
IBM, "Logical Partitioning", Dec. 18, 2000, 4 pp.
IBM, "Processor: Hardware for Logical Partitions", Dec. 21, 2000, 2 pp.

* cited by examiner

*Primary Examiner*—Meng-Ai An
*Assistant Examiner*—Kenneth Tang (57) ABSTRACT

An apparatus and method for routing a transaction to a partitioned server. The invention comprises identifying a plurality of partitions (e.g., logical, resource, etc.) on the server, determining a configuration for each partition, and providing the configuration to a load balancer, wherein the load balancer routes the transaction to one of the partitions based at least in part on the configuration thereof. The invention may further comprise assigning a rank to each partition based at least in part on the configuration thereof, wherein the transaction is routed based on the respective rank. The configuration may be determined in response to an event, on a continuous basis, etc. In addition, the load balancer may also use other factors, in combination with the configuration, to route the transaction to the partition, such as a characteristic of the transaction.

21 Claims, 4 Drawing Sheets

| PARTITION ID | NETWORK ADDRESS | CORRESPONDING CONFIGURATION | ASSIGNED RANK |
|---|---|---|---|
| A | 1.1.1.1 | RESOURCE ALLOCATION = 20%<br>RESOURCE UTILIZATION = 50%<br>AVG RESPONSE TIME = 0.5 ms | 3 |
| B | 1.1.1.2 | RESOURCE ALLOCATION = 50%<br>RESOURCE UTILIZATION = 35%<br>AVG RESPONSE TIME = 0.2 ms | 1 |
| C | 1.1.1.3 | RESOURCE ALLOCATION = 30%<br>RESOURCE UTILIZATION = 40%<br>AVG RESPONSE TIME = 0.3 ms | 2 |
| ... | ... | ... | ... |
| PARTITION n | 1.1.1.n | CONFIGURATION n | RANK n |

PARTITION PROFILE — 300
310 PARTITION ID
320 NETWORK ADDRESS
330 CORRESPONDING CONFIGURATION
340 ASSIGNED RANK

FIG. 4

APPARATUS AND METHOD FOR ROUTING A TRANSACTION TO A PARTITIONED SERVER

FIELD OF THE INVENTION

The invention pertains to an apparatus and method for routing a transaction to a partition on a server based at least in part on the configuration thereof.

BACKGROUND OF THE INVENTION

Servers are used to process transactions from various workstations on networks ranging from small, local area networks (LANs), to large, wide area networks (WANs), including corporate Intranets, and indeed, even the Internet. Often, multiple servers are used to handle the transaction load. The individual servers may be dedicated to distinct departments (e.g., the accounting department, the marketing department, etc.). Alternatively, individual servers may be dedicated to distinct tasks (e.g., processing orders, inventory, etc.). Likewise, multiple servers may be pooled, and the incoming transactions directed to an available server in the server pool using a load balancer. As such, the traffic is balanced across all of the servers in the pool, and the transactions are processed more quickly.

Multiple servers, however, may be an inefficient use of the available resources. For example, the processors of a dedicated server, or servers in a server pool, may be underutilized. In addition, each server requires physical space, increasing operation costs. Furthermore, servers that are spread out over various locations may require the attendance of separate administrators.

One solution is a partitioned server. A partitioned server is a single server or aggregation of server resources subdivided to perform as multiple servers. Thus, a partitioned server continues to service multiple locations, multiple departments, and/or multiple transactions. As such, fewer individual servers are needed and operations are centralized, while maintaining the distinct characteristics of multiple individual servers. In addition, utilization of the server resources is enhanced.

The partitions of partitioned servers, however, may not be equally weighted. As such, some partitions may be better able to process transactions than other partitions, based on the configuration thereof. For example, one partition may be allocated 30% of the server resources (e.g., the CPU), while another partition may be allocated 70% of the server resources. Or for example, one partition may be allocated two processors while another partition is allocated only one processor. In addition, servers may be dynamically partitioned. For example, a partition that is originally allocated 10% of the server resources, may later be allocated an additional 20% of the server resources (e.g., based on the time of day). Or for example, a partition may be allocated three processors initially, and later allocated only one processor. However, current approaches to load balancing do not recognize the partitions of a server and the various configurations thereof.

SUMMARY OF THE INVENTION

The inventors have devised an apparatus and method for routing a transaction to a partitioned server. The invention generally comprises identifying a plurality of partitions on the server, determining a configuration for each partition, and providing the configuration to a load balancer, wherein the load balancer routes the transaction to one of the partitions based at least in part on the configuration thereof. Optionally, one or more characteristics of the transaction may also be determined and used for routing the transaction to the appropriate partition. The server may include a logical partition. That is, the server may be a consolidation of multiple, independent servers, each having its own resources, operating system, etc., which make up the partitions thereon. Alternatively, the server may include resource partitions. That is, the server may be a single server having separate resources allocated to each partition. Furthermore, the partitions may be statically or dynamically configured. In addition, the partitioned server may be included in a pool of servers including other partitioned and/or non-partitioned servers.

The apparatus of the invention is preferably embodied in computer readable program code, and comprises program code for identifying a plurality of partitions on the server. Preferably, each partition has a network interface card so that each partition can be identified by a distinct network address. The apparatus also comprises program code for determining a configuration (e.g., the allocation of resources) for each partition. The configuration is preferably obtained from a partition manager that manages the resources of each partition on the server. The apparatus also comprises program code for providing the configuration to a load balancer. The load balancer routes the transaction to one of the partitions of the server based at least in part on the configuration thereof. The load balancer may also use other factors (e.g., response time of each partition, network proximity, etc.), in combination with the configuration to route the transaction to the partition. These factors may be included with the configuration, separately provided, and/or determined by the load balancer. The apparatus may further comprise program code for assigning a rank to each partition based at least in part on the configuration thereof, wherein the transaction is routed based on the rank. The rank may be based on any suitable factors, such as the relative weight of resources allocated to each partition, frequency with which the partition changes, response time of the partition, etc.

The method of the invention may comprise identifying a plurality of partitions on the server, determining a configuration of each partition, optionally determining at least one characteristic of the transaction, and providing the configuration to a load balancer, wherein the load balancer routes the transaction to one of the partitions based at least in part on the configuration thereof, and optionally also based on the characteristic(s) of the transaction. The configuration may be determined in response to a predetermined event or events. Alternatively, the configuration may be determined on a continuous basis (e.g., polling, receiving periodic updates, etc.). The method may also comprise assigning a rank to each of the partitions based at least in part on the configuration thereof, wherein the transaction is routed based on the rank thereof. In addition, the method may also comprise storing the configuration in a partition profile.

As such, the apparatus and method of the invention recognizes and routes the transaction to the partition on the server, based at least in part on the configuration of the partition. The configuration also preferably accounts for the relative weight of each partition and whether the server is statically and/or dynamically partitioned.

These and other important advantages of the present invention will be further explained in, or will become apparent from, the accompanying description, drawings and claims.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 1:
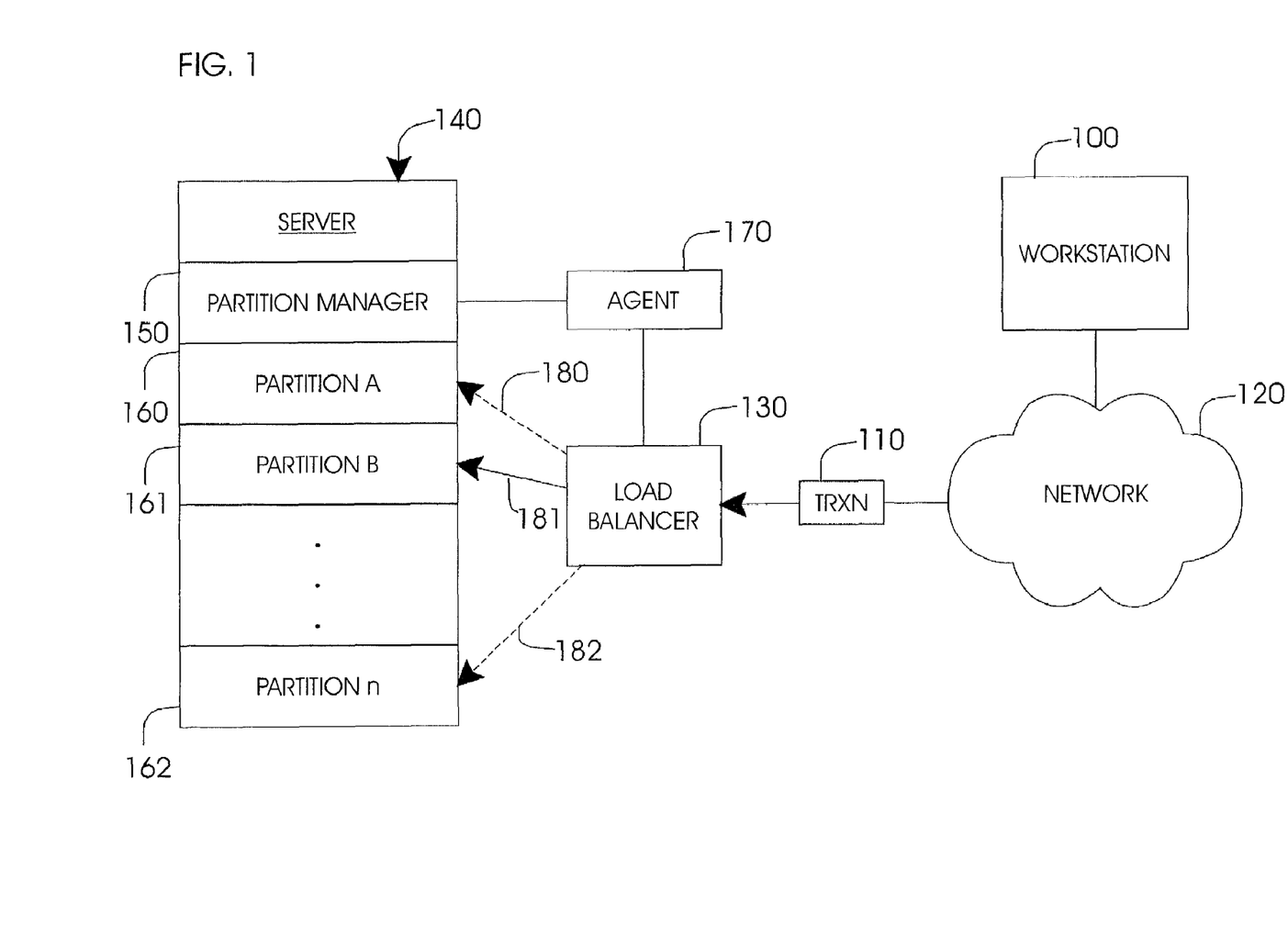
FIG. 1 is a high-level diagram showing a transaction routed to a partitioned server.

FIG. 1 is a high-level diagram showing a workstation 100 for generating a transaction 110 that is, in turn, routed over a network 120 via a load balancer 130 to a partitioned server 140. The server 140 preferably comprises a partition manager 150 (e.g., software and/or hardware module) for managing the resources of a plurality of partitions 160, 161, 162. An agent 170 (i.e., a software and/or hardware module) is stored on a number of (i.e., one or more) computer readable storage media. For example, the agent 170 may reside at the load balancer 130, at the server 140, independently (e.g., on an administrator terminal, not shown), or at a combination thereof. The agent 170 interacts with the server 140 (e.g., via the partition manager 150) and the load balancer 130. That is, the agent 170 identifies the partitions 160-162 on the server 140 and the configuration thereof, and provides the same to the load balancer 130. The load balancer 130, in turn, routes 180, 181, 182 the transaction 110 to one of the partitions 160-162 based on the configurations thereof.

It is understood that the load balancer 130 may route 180, 181, 182 the transaction 110 to one of the partitions 160-162 based any number of factors, such as the configuration (e.g., resource allocation) of the partition 160 and/or other system metrics (e.g., response time, load). For example, where Partition B (e.g., 161) is allocated 50% of the server 140 resources (e.g., CPU, storage capacity, etc.) and Partition A (e.g., 160) is allocated only 10% of the server 140 resources, the transaction 110 may be routed to Partition B. Or for example, where Partition A is allocated a faster CPU than the other partitions 160-162, the transaction 110 may be routed to Partition A. Or for example, even where Partition A is allocated a greater percentage of the CPU, the load may be higher and the response time slower, than on Partition B. Also, Partition B may have access to the application needed to process the transaction and Partition A may not. Therefore, in this example, the transaction 110 may be routed to Partition B. As yet another example, the transaction 110 may be routed to Partition B where Partition A may be capable of processing the transaction 110 faster so as to keep Partition A available for a higher priority transaction 110 (e.g., based on origination).

It is understood that the transaction 110 may be any suitable size and can take any suitable form, such as a packetized data signal. In addition, the transaction 110 may include any data that is to be processed in any number of ways. For example, the transaction 110 may be an email message to be delivered to a recipient, a uniform resource locator (URL) requesting a hypertext markup language (HTML) page from the corresponding Internet site, data to be stored in a network area storage (NAS) device, spreadsheet data for tabulation, a portion thereof to be reassembled upon reaching the destination server, etc.

It is also understood that although the agent 170 is preferably computer readable program code, the agent 170 may also be hardware, firmware, etc., or a combination thereof. In addition, the agent 170 may be a separate software and/or hardware module, integrated as part of the load balancer 130 and/or the server 140 (e.g., as part of the partition manager 150), executed on a separate server, workstation, etc., or a combination thereof.

It is further understood that the server 140 may be any suitable server and may comprise any number of partitions 160-162. Preferably, the server 140 comprises logical partitions 160-162. That is, the server 140 comprising logical partitions 160-162 represent independent resources in a single, multiprocessing system having independent resources (e.g., CPU, memory, etc.). For example, a server with logical partitions 160-162 may include three processors, each processor identified as a separate partition 160 and running a separate operating system thereon. Logical partitioning is available, as an example, for IBM AS/400e series systems with multiple processors. Alternately, the server 140 comprising resource partitions 160-162 may be a single server having separately allocated resources. For example, a server 140 with resource partitions 160-162 may have a single processor that is allocated 20% to a first partition, 30% to a second partition, and 50% to a third partition. Although there is only a single processor with a single operating system, each of the three partitions appears on the network (e.g., via IP address) as three distinct servers. Resource partitioning is available, as an example, using the Process Resource Manager available from Hewlett Packard Company. Also as an example, see co-owned U.S. patent application Ser. No. 09/493,753 filed Jan. 28, 2000 and titled DYNAMIC MANAGEMENT OF COMPUTER WORKLOADS THROUGH SERVICE LEVEL OPTIMIZATION, hereby incorporated by reference for all that it discloses. However, it is understood that the server 140 may be partitioned in any suitable manner.

Furthermore, the partitions 160-162 may be statically configured. That is, statically configured partitions 160-162 comprise resources or resource allocations that do not change during the operation thereof. For example, statically configured partitions 160-162 may be allocated two CPUs, or may be allocated 50% of a single CPU at startup or initialization until the server 140 is shut down, taken offline, or otherwise reinitialized. Alternatively, the partitions 160-162 may be dynamically configured. That is, dynamically configured partitions 160-162 comprises resources and/or resource allocations that may change during the operation thereof. For example, dynamically configured partitions 160-162 may also be allocated two CPUs, or may be allocated 50% of a single CPU at startup or initialization. However, the configuration of the partitions 160-162 may change during the operation of the server 140. For example, the partitions 160-162 may be allocated an additional CPU, or 75% of a single CPU. In yet another embodiment, one or more partitions 160-162 may be statically configured, while other partitions 160-162 are dynamically configured. In addition, the partitions 160-162 may be dedicated (e.g., to a corporate department, for a particular purpose, etc.). In such an embodiment, the dedication may be included as part of the configuration of the partitions 160-162.

It is understood that the invention may be used with any suitable number and/or type of load balancer 130. For example, the load balancer 130 may be a switch, a general purpose server (e.g., performing the function of a load balancer while also performing other functions), a load balancing appliance (e.g., a server dedicated to the function of load balancing), etc.

In another embodiment, the load balancer 130 may be modified to provide information to the agent for making a determination as to the routing of incoming transactions 110 received at the load balancer 130. For example, the load balancer 130 may be modified (e.g., include program code) to determine at least one characteristic of the incoming transaction 110. The characteristic(s) may be determined by reading a tag associated with the transaction 110, which can be provided to the agent 170 or used by the load balancer 130 to route the transaction 110 to the partition 160-162 based at least in part thereon. Tagging a transaction 110 and modifying the load balancer 130 for reading the tag are disclosed in co-owned U.S. patent application Ser. No. 09/751,009, titled APPARATUS AND METHOD FOR IDENTIFYING A REQUESTED LEVEL OF SERVICE FOR A TRANSACTION, and filed on Dec. 29, 2000, and in co-owned U.S. patent application Ser. No. 09/751,011, titled APPARATUS AND METHOD FOR ROUTING A TRANSACTION BASED ON A REQUESTED LEVEL OF SERVICE, and filed on Dec. 29, 2000, both hereby incorporated by reference for all that is disclosed therein.

For example, the characteristic(s) may include a type of transaction (e.g., video streams, backup requests, etc.), a requested level of service (e.g., high priority, low priority), a combination thereof, etc. These examples are merely illustrative and other embodiments are also contemplated within the scope of the invention, such as, but not limited to user identification, originating application, origination time, etc.

It is also understood that the workstation 100 can be any suitable workstation, such as a personal computer (PC), a laptop computer, a handheld computer, an administrator terminal, an Internet appliance (i.e., an Internet-ready, wireless device). Furthermore, the network 120 may be any suitable network and includes the components thereof (e.g., routers, hubs, etc.). For example, the network 120 may be a local area network (LAN), a wide area network (WAN), an Intranet, the Internet, etc., or a combination thereof. Likewise, the network resources (e.g., workstation 100, load balancer 130, server 140, routers, hubs, etc.) may be directly or indirectly linked to one another and to the network 150. Suitable connections include, but are not limited to, a dial-up modem connection, a digital subscriber line (DSL), T-1 connection, cellular link, infrared link, BLUETOOTH(™) link, satellite link, etc.

Figure 2:
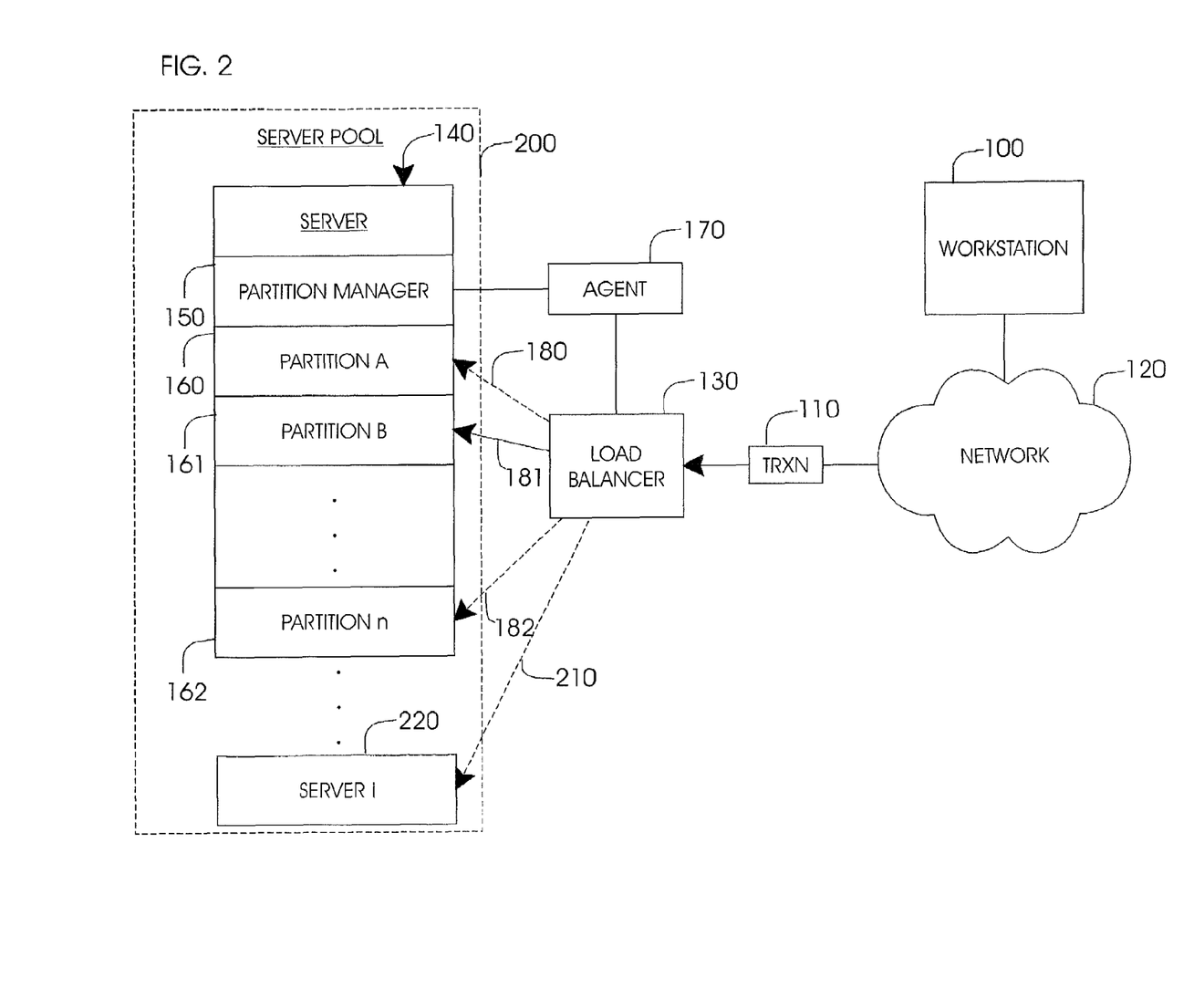
FIG. 2 is a high-level diagram showing the transaction routed to a partitioned server in a server pool.

Alternatively, the transaction 110 is shown in FIG. 2 routed to a partition F 160 of the server 140 that is selected from a server pool 200 on the network 120. In this embodiment, the transaction 110 may be routed 180 to a partition 160 on a single server 140, and/or routed 210 to another server 220 in the server pool 200. The other server 220 may be a partitioned server, in which the transaction 110 is routed to a partition thereon, as described above. Alternatively, the other server 220 may be a non-partitioned server, in which the transaction 110 is routed to the server itself.

It is understood that the server pool 200 may include any number of servers 140, 220. In addition, the other servers 220 in the server pool 200 may comprise partitioned servers, non-partitioned servers, and/or a combination thereof. The agent 170 may interact with a single partitioned server 140 (e.g., via the partition manager 150 thereof) or may also interact with one or more of the other servers 220. Alternatively, more than one agent 170 may be provided to interact with one or more of the other servers 220.

The partition manager 150 is preferably software running on the server 140 for allocating the partitions 160-162 thereon. For example, where the server 140 includes logical partitions 160-162, the partition manager 150 may reside on a single partition 160, or have modules on each partition 160 for monitoring the configuration thereof (e.g., the resource utilization, load, etc.). Or for example, where the server 140 includes resource partitions, the partition manager 150 again may reside on a single partition 160, or have modules on each partition 160-162 for monitoring the configuration and allocating resources to the various partitions 160-162. In any event, the partition manager 150 determines the configuration of the partitions 160-162 on the server 140 and provides the same to the agent 170.

It is understood that the partition manager 150 may be software and/or hardware. For example, the partition manager 150 may be the Process Resource Manager cited above. In addition, the partition manager 150 may be integrated as part of the operating system on the server 140, or may be a separate module. Alternatively, the partition manager 150 may not be needed at all (e.g., in a statically configured server having logical partitions), and the agent 170 can obtain the configuration directly (e.g., via suitable software for probing the server 140) or via the operating system on the server 140.

It is understood that the embodiments shown in FIG. 1 and FIG. 2 are merely illustrative of an environment in which the invention may be implemented. Other embodiments are also contemplated as being within the scope of the invention. In another embodiment, there may be multiple server pools 200. In yet another embodiment, there may be a combination of server pools 200 and individual partitioned servers 140, wherein the partitioned server itself is treated as a server pool. In yet another embodiment, there may be multiple load balancers 130 for balancing the load among alternate server pools 200. There can also be a hierarchy of load balancers 130, wherein a first load balancer passes the transaction to one of several load balancers, which then route the transaction 110 within a server pool 200 or within a server 140 (i.e., to the partition 160). In addition, a load balancer 130 may reject or bounce a transaction 110 when none of the partitions 160-162 are able to efficiently process the transaction 110. In such an embodiment, the load balancer 130 may return the transaction 110 to the workstation 100, pass the transaction 110 to another load balancer 130, process the transaction 110, and send a suitable indicator (e.g., an email, a warning message, etc.) to the workstation 100 notifying the user that the server 140 is experiencing heavy volume or down time that is slowing the processing of the transaction 110.

Under any of these embodiments, the agent 170 interacts with the server 140 and the load balancer 130 to provide the configuration of the partitions 160-162 to the load balancer 130. The load balancer 130, in turn, routes 180 the transaction 110 to one of the partitions 160-162 based on their respective configurations. This interaction may include the agent 170 polling the server 140 (e.g., the partition manager 150, the operating system, individual partitions, etc.) to identify the partitions 160-162 and determine the configuration thereof. The agent 170 may poll the server 140 on a regular or continuous basis, at startup, or any other predetermined time or interval. Alternatively, the partition manager 150 may signal the agent 170 when an event occurs. For example, the partition manager 150 may signal the agent 170 when the configuration of a partition 160-162 changes. In addition, this interaction may include the agent 170 gathering other information about the server 140, the server pool 200, the network 120, etc. For example, the agent 170 may determine or obtain the time of day, the current network load, the predicted load, servers that are inactive or otherwise not responding, etc. The agent 170 may include program code for obtaining such information directly, for obtaining it from other program code and/or devices on the network 120, or a combination thereof.

The interaction may also include the agent 170 transmitting the configuration of the partitions 160-162 to the load balancer 130. Alternatively, the load balancer 130 may obtain the configuration of the partitions 160-162 from the agent 170 on a predetermined basis (i.e., periodically, when there is an event, on an as-needed basis, etc.). Indeed, one or more parameters (e.g., time of day) may also be obtained by the load balancer 130 itself, and used in combination with the configuration provided by the agent 170 to route 180 the transaction 110 to one of the partitions 160-162 based on their configuration.

Figure 3:
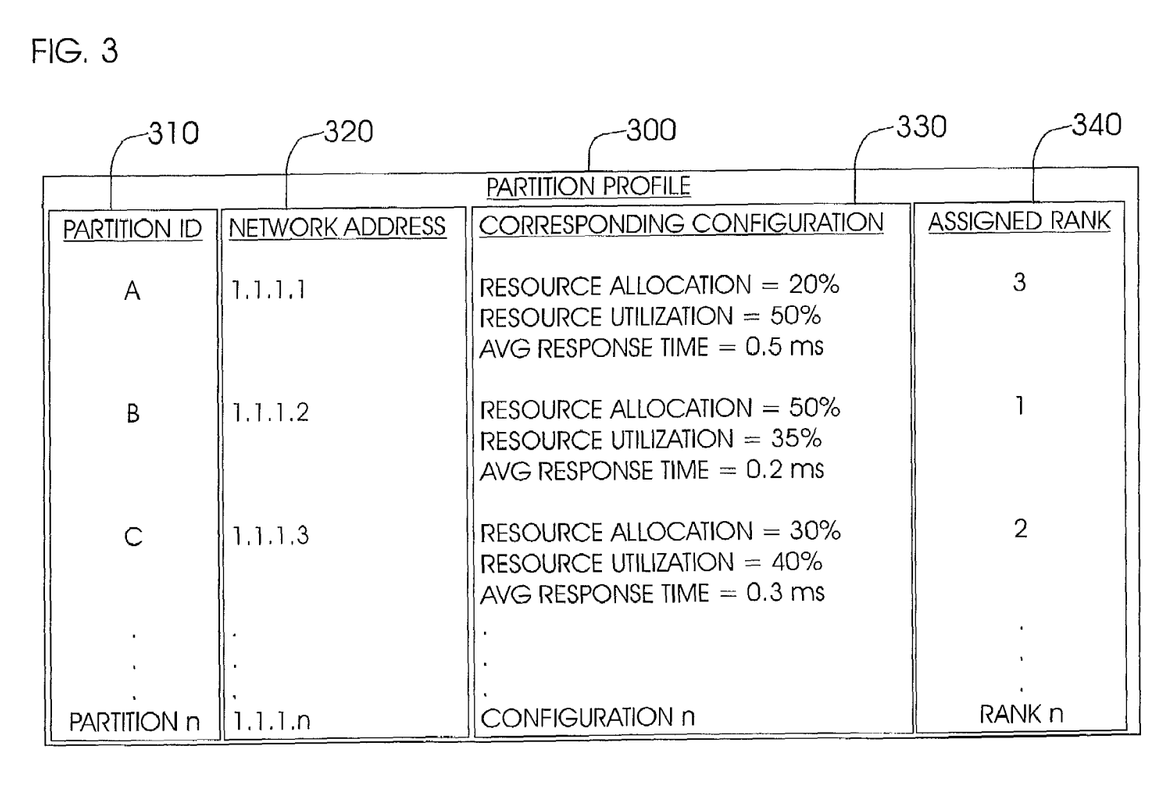
FIG. 3 illustrates a partition profile for maintaining the configuration of the partitions.

FIG. 3 illustrates a partition profile 300 for maintaining the configuration of the partitions 160-162. The partition profile 300 may be generated by the agent 170 and is preferably a computer readable file, such as a database, multi-dimensional array, etc. The partition profile 300 preferably comprises a partition identification 310, a network address 320 (e.g., an IP address, port, etc.), a corresponding configuration 330, and an assigned rank 340. The partition identification 310 identifies the various partitions 160-162 on the server 140. For example, the partition identification 310 of "A", "B", and "C" are shown in the partition profile of FIG. 3, corresponding to the partitions 160-162 of the server 140 shown in FIG. 1 and FIG. 2. The network address 320 identifies the location of the identified partition 310 on the network 120 for routing the transaction 110 thereto. Preferably, a separate network address 320 is assigned to each partition 160-162 via a separate network card for each partition 160-162. The corresponding configuration 330 comprises the configuration parameters of the respective partition 160-162. For example, the corresponding configuration 330 may include the resource allocation (e.g., 20% CPU), the resource utilization (e.g., 50% CPU utilization), the average response time (e.g., 0.5 ms), or any other suitable information regarding the partitions 160-162. The assigned rank 340 may be determined using suitable program code for analysis of the configuration, performance, etc., and may be assigned by the agent 170. For example, the rank can be determined based on response time, resource utilization, processing speed, the weight of resources allocated to each partition, etc.

It is understood that the information stored in the partition profile 300 can take any suitable form. The partitions 160-162 can be identified at 310 using any suitable indicator, such as a name, serial number, etc. Likewise, any suitable routing instructions can be identified at 320, such as an IP address, port identification, etc. Similarly, any suitable information may be included as part of the corresponding configuration 300, including specifics of the various resources and the corresponding allocation thereof. Likewise, the assigned rank 340 can be any suitable indicator, such as a numerical assignment (e.g., "1", "2", "3"), an empirical assignment (e.g., "Fast", "Slow"), a specific parameter (e.g., "0.5 ms"), etc. In addition, the information stored in the partition profile 300 may vary by partition 160-162, by server 140, by server pool 200, etc. For example, one partition 160 may be identified by an IP address, another partition 161 may be identified by port identification. Also for example, the corresponding configuration 330 of one partition 160 may include one or more parameters not identified for other partitions 161-162.

It is also understood that the partition profile 300 shown in FIG. 3 is merely illustrative of one embodiment of a partition profile that can be used under the teachings of the invention, and is not intended to limit the scope of the invention thereto.

For example, in another embodiment, the partition profile 300 may also include other servers (e.g., 220) and/or other partitions 160-162 and the corresponding configuration thereof (e.g., 330). Also for example, the partition profile 300 may include a department ID, a server ID, a server pool ID, etc. The assigned rank 340 may be included as part of the corresponding configuration 330. The assigned rank 340 need not even be included as part of the partition profile 300, and indeed, the various data may be stored in separate profiles (e.g., a partition identification profile, a configuration profile, etc.). Likewise, more than one partition profile 300 may be generated and/or accessed by one or more agents 170.

Figure 4:
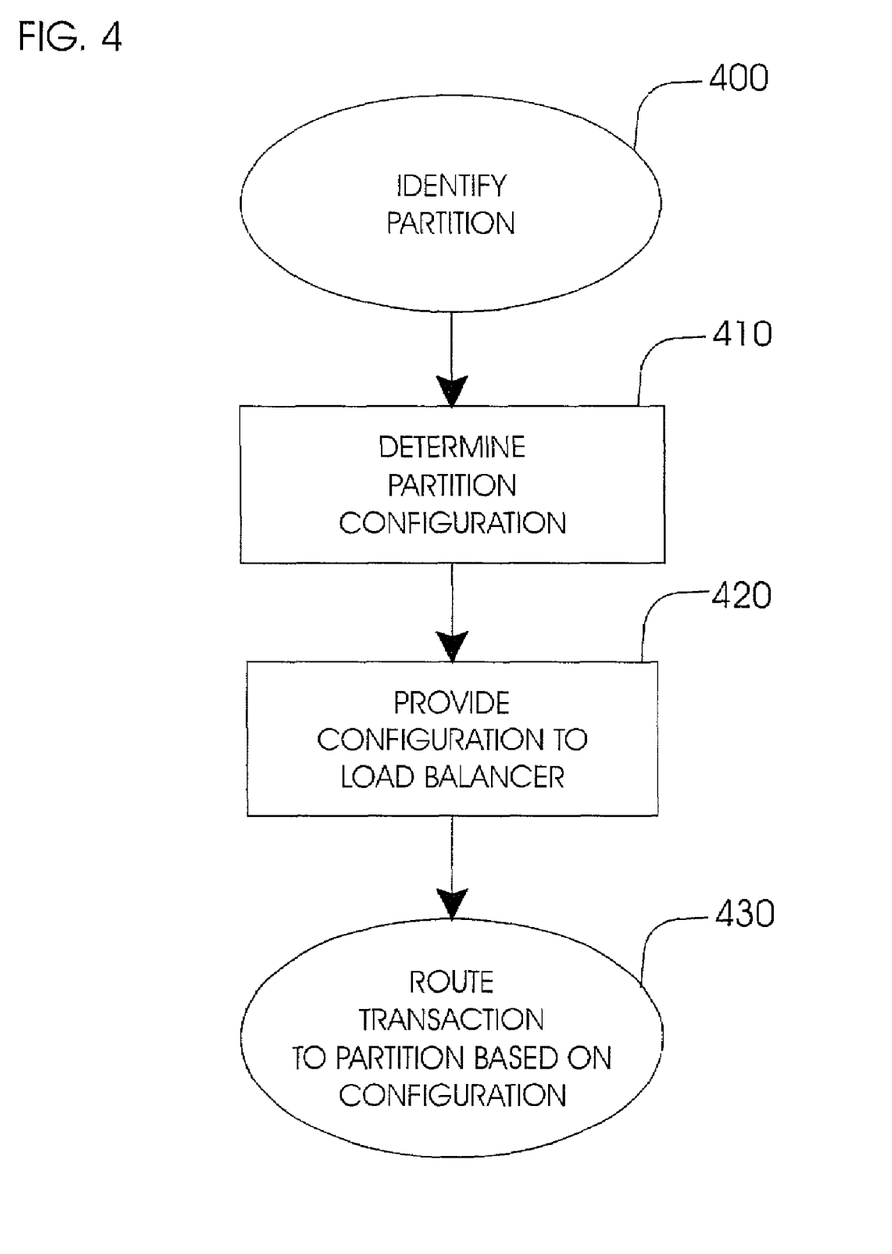
FIG. 4 is a flow chart showing one embodiment of a method for routing the transaction to the server.

FIG. 4 illustrates one embodiment of a method for routing the transaction to the server. In step 400, the partitions 160-162 are identified on the server 140. For example, the agent 170 obtains the partition identifications (e.g., 310 in FIG. 3) and the network location (e.g., network address 320 in FIG. 3) for each partition 160-162 on the server 140. The agent 170 may identify the partitions 160-162 through interaction with the partition manager 150, or otherwise, as discussed above. In step 410, the configuration of the partition is determined. For example, the agent 170 receives or otherwise obtains the corresponding configuration (e.g., 330 in FIG. 3) from the partition manager or otherwise. As discussed above, the configuration may include resources allocated to the partitions 160-162, utilization of those resources, average response time, assigned rank, etc. In step 420, the configuration is provided to the load balancer 130. For example, the agent 170 may provide the raw data (e.g., resource allocation) to the load balancer 130 for analysis by suitable program code at the load balancer 130. Alternatively, the agent 170 may include program code for analyzing the raw data. For example, program code can be provided for determining a rank (e.g., 340 in FIG. 3) for each partition 160-162. Preferably, the agent 170 generates and maintains a partition profile 300, which can be transmitted to the load balancer 130 in its entirety, or in part. In step 430, the transaction 110 is routed to the partition 160 based on the configuration thereof. For example, the load balancer 130 receives the configuration of the identified partitions 160-162 and may integrate this information with other system metrics to determine the one of the partitions 160-162 based on their respective configurations (e.g., Partition B in FIG. 1 and FIG. 2, as indicated by the solid line).

It is understood that the steps shown in FIG. 4 are merely illustrative of one embodiment of the method of the invention, and that other embodiments are also intended to be within the scope of the invention. Another embodiment may include additional steps. For example, another embodiment may include assigning the rank 340 to the partition 160-162 identified in step 400. Or for example, another embodiment may include selecting the partitioned server 140 from a pool of servers 200, as shown and described with respect to FIG. 2. Other embodiments are also contemplated under the teachings of the invention.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for routing a transaction to a partitioned server, comprising:

identifying a plurality of partitions on said partitioned server;

determining a configuration of each of said plurality of partitions;

providing said configurations to a load balancer, wherein said transaction is routed by said load balancer to one of said plurality of partitions based at least in part on said configurations;

assigning a rank to each of said plurality of partitions based at least in part on said configurations, wherein said transaction is routed based on said ranking; and storing said configurations in a partition profile, wherein said configurations are provided to said load balancer via said partition profile.

2. A method as in claim 1, wherein said configurations are determined in response to an event.

3. A method as in claim 1, wherein said configurations are determined on a continuous basis.

4. A method as in claim 1, wherein said plurality of partitions are identified based on a network address for each of said plurality of partitions.

5. A method as in claim 1, further comprising selecting said partitioned server from a pool of servers.

6. An apparatus for routing a transaction to a partitioned server, comprising:
   a number of computer readable storage media;
   computer readable program code stored on said number of computer readable storage media, comprising:
   a) program code for identifying a plurality of partitions on said partitioned server;
   b) program code for determining a configuration for each of said plurality of partitions in response to an event;
   c) program code providing said configuration of each of said plurality of partitions to a load balancer, wherein said transaction is routed by said load balancer to one of said plurality of partitions based at least in part on said configuration thereof; and
   d) program code for assigning a rank to each of said plurality of partitions based at least in part on said configuration thereof, wherein said transaction is routed based on said rank.

7. An apparatus as in claim 6, wherein said program code for determining said configuration receives said configuration from a partition manager.

8. An apparatus as in claim 6, wherein said program code for identifying said plurality of partitions separately identifies each of said plurality of partitions by a network address.

9. An apparatus as in claim 6, wherein said program code for identifying said plurality of partitions identifies said plurality of partitions as logical partitions on said server.

10. An apparatus as in claim 6, wherein said program code for identifying said plurality of partitions identifies said plurality of partitions as resource partitions on said server.

11. An apparatus as in claim 6, wherein said program code for determining said configuration determines the allocation of at least on resource to each of said plurality of partitions.

12. An apparatus as in claim 6, further comprising program code for determining a rank of said partitions based on the relative weight of resources allocated to each of said plurality of partitions.

13. An apparatus as in claim 6, further comprising program code for selecting said partitioned server form a pool of servers.

14. An apparatus as in claim 6, wherein said program code for identifying said plurality of partitions identifies said plurality of partitions a dynamically configured.

15. An apparatus as in claim 6, wherein said program code for identifying said plurality of partitions identifies each of said plurality of partitions by separate network interface cards.

16. An apparatus having a processor for routing a transaction to a partitioned server, comprising:
   means for identifying a plurality of partitions on said partitioned server;
   means for determining a configuration of each of said plurality of partitions in response to an event;
   means for routing said transaction to one of said plurality of partitions based at least in part on said configuration thereof; and
   means for assigning a rank to each of said plurality of partitions based at least in part on said configuration thereof, wherein said transaction is routed based on said rank.

17. A method for routing a transaction to a partitioned server, comprising:
   identifying a plurality of partitions on said partitioned server based on a network address for each of said plurality of partitions;
   determining a configuration of each of said plurality of partitions in response to an event;
   determining at least one characteristic of said transaction; and
   routing said transaction to one of said plurality of partitions based on said configurations of said plurality of partitions and based on said at least one characteristic of said transaction.

18. A method as in claim 17, further comprising comparing said at least one characteristic of said transaction with said configuration of each of said plurality of partitions.

19. A method as in claim 17, wherein said at least one characteristic is determined by reading a tag associated with said transaction.

20. A method as in claim 17, wherein said at least one characteristic is determined to be a type of said transaction.

21. A method as in claim 17, wherein said at least one characteristic is determined to be a requested level of service for said transaction.

* * * * *

UNITED STATES PATENT AND TRADEMARK OFFICE
CERTIFICATE OF CORRECTION

| | | |
|---|---|---|
| PATENT NO. | : 7,523,454 B2 | |
| APPLICATION NO. | : 09/799662 | |
| DATED | : April 21, 2009 | |
| INVENTOR(S) | : Francisco J. Romero et al. | |

It is certified that error appears in the above-identified patent and that said Letters Patent is hereby corrected as shown below:

In column 5, line 50, after "partition" delete "F".

In column 9, line 53, in Claim 11, delete "at least on" and insert -- at least one --, therefor.

In column 10, line 10, in Claim 14, after "partitions" delete "a" and insert -- as --, therefor.

Signed and Sealed this

Eighth Day of September, 2009

David J. Kappos
*Director of the United States Patent and Trademark Office*